US005276532A

United States Patent [19]

Harrington

[11] Patent Number: 5,276,532

[45] Date of Patent: Jan. 4, 1994

[54] SPLIT-LEVEL FRAME BUFFER

[75] Inventor: Steven J. Harrington, Holley, N.Y.

[73] Assignee: Xerox Corporation, Stamford, Conn.

[21] Appl. No.: 797,876

[22] Filed: Nov. 26, 1991

[51] Int. Cl.[5] .............................................. H04N 1/387

[52] U.S. Cl. .................................... 358/444; 358/524; 382/22; 345/145; 345/186

[58] Field of Search .................... 358/78, 404, 444, 75, 358/532, 524, 536, 534, 528; 382/22, 47, 17; 340/703; H04N 1/387

[56] References Cited

U.S. PATENT DOCUMENTS

| | | | |
|---|---|---|---|
| 4,507,685 | 3/1985 | Kawamura | 358/536 |
| 4,618,990 | 10/1986 | Sieb, Jr. et al. | 382/22 |
| 4,682,869 | 7/1987 | Itoh et al. | 358/447 |
| 4,703,363 | 10/1987 | Kitamura | 382/55 |
| 4,727,425 | 2/1988 | Mayne et al. | 358/523 |
| 4,743,962 | 5/1988 | McCormick | 358/524 |
| 4,782,399 | 11/1988 | Sato | 358/447 |
| 4,790,028 | 12/1988 | Ramage | 340/731 B |
| 4,896,146 | 1/1990 | Narumiya | 358/524 |
| 4,907,282 | 3/1990 | Daly et al. | 340/731 A |
| 4,974,071 | 11/1990 | Maeda | 358/539 |
| 5,046,119 | 9/1991 | Hoffert et al. | 358/524 |
| 5,115,402 | 5/1992 | Matsushiro et al. | 395/141 |
| 5,134,667 | 7/1992 | Suzuki | 382/17 |

*Primary Examiner*—Edward L. Coles, Sr.
*Assistant Examiner*—Jill Jackson
*Attorney, Agent, or Firm*—Oliff & Berridge

[57] ABSTRACT

A single, split-level frame buffer for use in a color imaging system includes a plurality of pixels having a first resolution level. A plurality of bits are provided for each pixel so as to enable accurate pictorial imaging. The frame buffer includes pixels having a resolution level which is higher than the first resolution level. Pixels on the edges of objects being imaged are replaced by the higher resolution pixels to provide images wherein object edges have high-resolution while object interiors have moderate resolution. In using a single frame buffer, images having more than one level of resolution are generated which do not require separation and merging operations.

22 Claims, 3 Drawing Sheets

SPLIT-LEVEL FRAME BUFFER

BACKGROUND OF THE INVENTION

1. Field of the Invention

The present invention relates to a frame buffer for use in color imaging and, more particularly, to a frame buffer having a plurality of levels of resolution.

2. Description of the Related Art

In generating color pictorial images, a large number of colors and moderate spatial resolution are generally required to achieve a high-quality image. Because the eye can detect approximately 100 intensity levels, i.e., for three color separations, seven bits per color separation per pixel, imaging systems should support at least this number of intensity levels. Generally, however, imaging systems support 256 different intensity levels. The 256 intensity levels supported by an imaging system performing three color separations for a full-color image correspond to eight bits per color separation, i.e., twenty-four bits per pixel. Accordingly, for high-quality renditions of real-life scenes, an imaging system supporting at least 100 intensity levels detectable by the eye requires less than 200 pixels per inch to achieve an image having a sufficient level of spatial resolution.

When material such as textual material and synthetic graphic material is being imaged, the accuracy of color is not nearly so important to achieve a high-quality image, particularly since the color used is generally a constant black. High spatial resolution is, however, needed to provide images having crisp, clear edges.

A desirable imaging system would support high-quality color pictorial images, synthetic graphic material and textual material. Heretofore, such an imaging system would necessarily have both a large color space, i.e., many bits per pixel, and a high-resolution level, i.e., many pixels, thus resulting in requirements for extensive memory capability and high bandwidth.

One known system separates pictorial material from textual and graphic material. The system processes the pictorial material in a different manner from the textual and graphic material and combines the results in a final imaging stage. Images commonly, however, incorporate combinations of types of material. For example, an image can comprise a picture of text. Accordingly, the separation and combination performed by the system can be extremely complex, particularly when there is an overlap in the types of material being imaged.

One known technique used for providing high-resolution for edge detail while providing lower resolution for object interiors is the method of quad-trees. This technique represents the image as a tree structure where each level of the tree expands to twice the resolution of the parent level. However, quad-trees require tree traversal to access pixels rather than the simple indexing of a frame buffer.

U.S. Pat. No. 4,782,399 to Sato, discloses an image processing apparatus having image input systems for input of image data of high and low-resolution. A processor discriminates an edge block in the image data, and a filter performs edge detection of an output from a low-resolution image input system. A signal selection circuit selects a signal from high-resolution and low-resolution image input systems and produces the selected signal as an output signal so as to reproduce optimum quality images for all types of original images including character and half tone images. The Sato apparatus thus processes the high resolution and low resolution image data differently. The Sato apparatus, accordingly, is complex in operation.

U.S. Pat. No. 4,703,363 to Kitamura discloses an apparatus for smoothing jagged border lines of an image by providing weight coefficients to a center pixel and surrounding pixels. Values are then obtained for designating middle level densities to be used for the smoothing in accordance with the sum of the coefficients. The apparatus does not provide an imaging system which supports pictorial material, synthetic graphic material and textual material without requiring extensive memory capability and high bandwidth.

U.S. Pat. No. 4,618,990 to Sieb, Jr., et al discloses a method of edge enhancement of digitized fluorographic images by defining frequency components to be enhanced to sharpen images. The frequency components correspond to the frequency response of the edge enhancement filter. An edge map results which corresponds to frequency components at edges which are added to corresponding pixels in the original image, resulting in sharpened edges. The method disclosed by the reference thus requires independent processing at edges and subsequent addition of a resultant edge map in the original image.

U.S. Pat. No. 4,682,869 to Itoh et al discloses an image processing system allowing communication with input and output devices having varying resolutions by converting input images into images having any desired level of resolution up to that of the input. The system thus requires a plurality of devices having varying resolutions to achieve a desired level of resolution in a resultant image.

An imaging system is desired which has the capability to support pictorial material, textual material and synthetic graphic material without requiring both a large color space and a high-resolution. Such an imaging system should generate high-quality images without significantly increasing the complexity of the system.

OBJECTS AND SUMMARY OF THE INVENTION

One object of the present invention is to provide a frame buffer for use in a color imaging system which enables generation of high-quality pictorial, textual and synthetic graphic images.

Another object of the present invention is to provide a frame buffer for use in a color imaging system which does not require both a large color space and a high-resolution to achieve a plurality of different types of high-quality images.

Another object of the present invention is to provide a frame buffer for use in a color imaging system which does not require extensive memory capability and high bandwidth.

Another object of the present invention is to provide a frame buffer for use in a color imaging system which does not require separate processing of different types of images and subsequent combination of the processed data.

A further object of the present invention is to provide a frame buffer for use in a color imaging system which is not complex.

To achieve the foregoing and other objects and to overcome the shortcomings discussed above, a frame buffer for use in a color imaging system includes a plurality of pixels having a first resolution level. A plurality of bits are provided for each pixel so as to enable accurate pictorial imaging. The frame buffer includes pixels having a resolution level which is higher than the first resolution level. Pixels on the edges of objects being imaged are replaced, by the higher resolution pixels to provide images wherein object edges have high-resolution while object interiors have moderate resolution. A single, split-level frame buffer is used so that images having more than one level of resolution do not require the performance of separation and merging operations.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
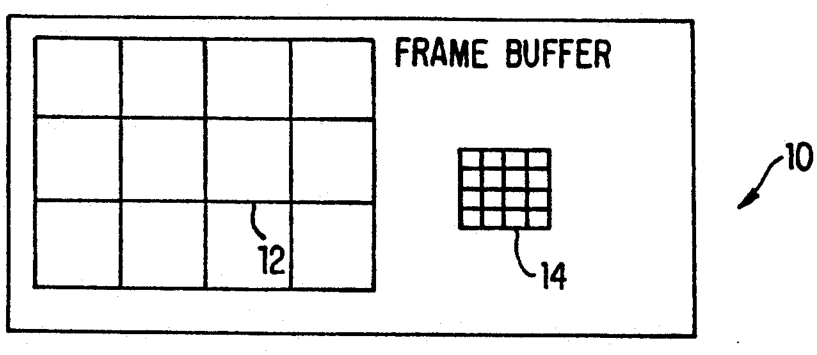
FIG. 1 illustrates a block diagram of a split-level frame buffer in accordance with the present invention.

Referring now to the drawings, and particularly to FIG. 1 thereof, a frame buffer 10 is described which includes a pixel 12 of moderate resolution which is to be replaced with a block 14 of higher resolution pixels. Frame buffer 10 supports a large color space, e.g., 256 intensity levels or twenty-four bits per pixel for three color separations required to form a full color image.

The replacement of the pixel 12 having a moderate resolution with a block of higher resolution pixels 14 can be effected in a plurality of different manners. One embodiment illustrated in FIGS. 2A–2E comprises a pointer 16 provided as instruction that a particular pixel is to be replaced with higher resolution pixels.

Figure 2A:
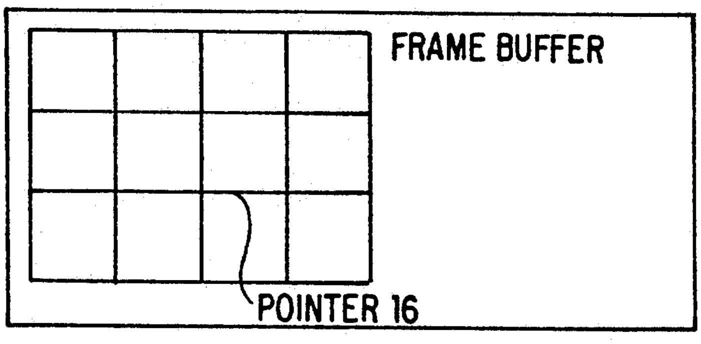
FIGS. 2A–2E illustrate a frame buffer in accordance with the present invention which stores pointers for instructing replacement of moderate resolution pixels with high-resolution pixels.
Figure 2B:
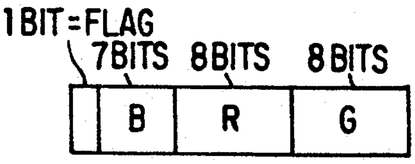
Figure 2C:
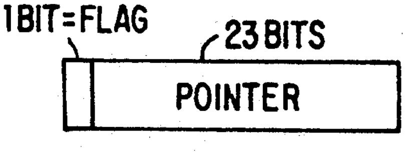

FIGS. 2A–2E illustrate the use of pointers to provide an instruction for expansion of the pixel. In a three color separation system, i.e., red, green and blue, for one or more color separation, the bits can be reduced from eight bits to seven bits. FIG. 2B illustrates the reduction of the blue color separation from eight bits to seven bits. The remaining bit is used as a flag serving as an indicator that the pixel is to be expanded. As illustrated in FIG. 2B, if the first bit is zero, no indication is provided that the pixel is to be expanded. Alternatively, as illustrated in FIG. 2C, if the first bit is one, an indication is made that the pixel is to be expanded. The remaining bits will then serve as an index into a list of expanded pixels.

Figure 2D:
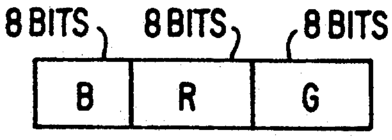
Figure 2E:
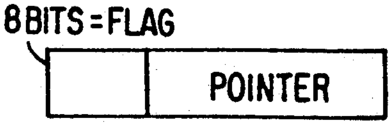

Alternatively, as illustrated in FIGS. 2D and 2E, the bits of one of the separations, e.g., the blue separation, can be used as a flag. Accordingly, as illustrated in FIG. 2E, the eight bits of one color separation, e.g., the blue separation, could be used as the flag indicating expansion of the pixel. Similar to the FIG. 2B embodiment, if any of the first eight bits are zero, no indication is provided that the pixel is to be expanded as illustrated in FIG. 2D. Alternatively, if all of the first eight bits are one, an indication is made that the pixel is to be expanded as illustrated in FIG. 2E. The remaining bits will then serve as an index into a list of expanded pixels.

Figure 3A:
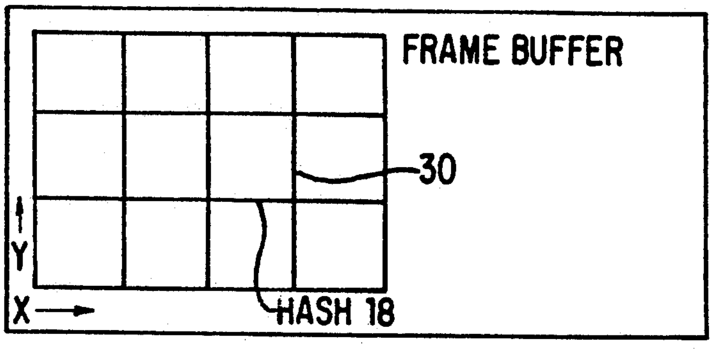
FIGS. 3A and 3B illustrate a frame buffer including a hash table for storage of high-resolution pixels.
Figure 3B:
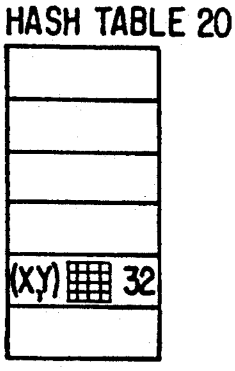

As illustrated in FIGS. 3A–3B, another approach which can be used for pixel expansion comprises the use of a hash table. In this type of approach, each pixel would have a location identifiable, for example, by a (x,y) location. A pixel 30 which is to be expanded to a block of higher resolution pixels 32 could have a particular value 18 which indicates that the pixel requires expansion location as illustrated in FIG. 3A. One would then apply a hash function to the (x,y) location of the pixel in order to arrive at an address into a hash table 20. The hash table 20 would store the expanded, higher resolution pixels in accordance with (x,y) location. Expanded pixels would thus be located by using the hash table addressed by the location of a hash at a pixel location. The (x,y) location would also be stored to confirm which color belongs at the location.

Figure 4:
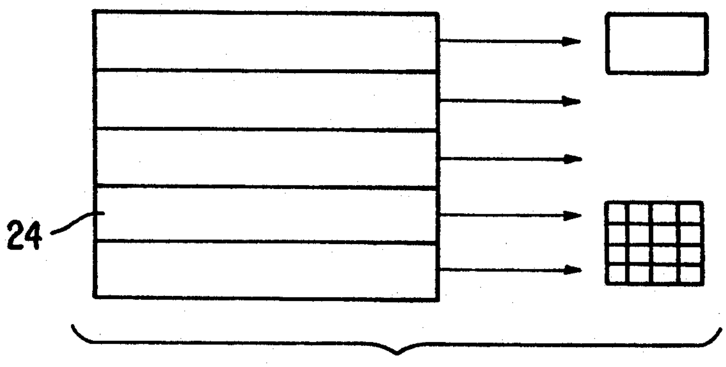
FIG. 4 illustrates a frame buffer having scan-line buckets for arrangement of high-resolution pixels.

Another approach which could be used to indicate pixels to be replaced by higher resolution pixels is to organize the expanded pixels into lists, with a separate list for each scan line as illustrated in FIG. 4. In accordance with this approach, as the frame buffer is imaged, list entries 22 sorted, for example, into raster order could be provided. As a scan line 24 having a pixel to be expanded is encountered, a search would be performed for the appropriate lists having the expanded pixels. By sorting the lists entries into raster order, simplified retrieval of the expanded pixels can be achieved.

A further approach that can be used to effect the replacement of a pixel with higher resolution pixels can be used when there are only a few distinct colors present within the expanded pixel. Instead of storing the color of each high resolution pixel, one can store a list of the colors actually present and the mapping of the colors to the high-resolution pixels. There are a plurality of means for describing the lists of colors and for mapping the colors to the high resolution pixels, but one such means for the case of only two colors in the expanded pixel is to use a bitmap to select between the two colors.

Figure 5A:
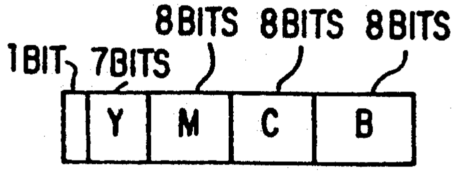
FIGS. 5A–5C illustrate an image buffer using one bit of a color separation of the color value for a pixel entry for indicating the pixel being replaced with high-resolution pixels.
Figure 5B:
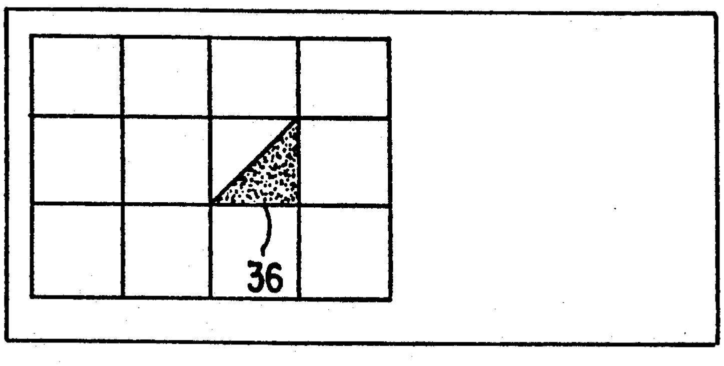
Figure 5C:
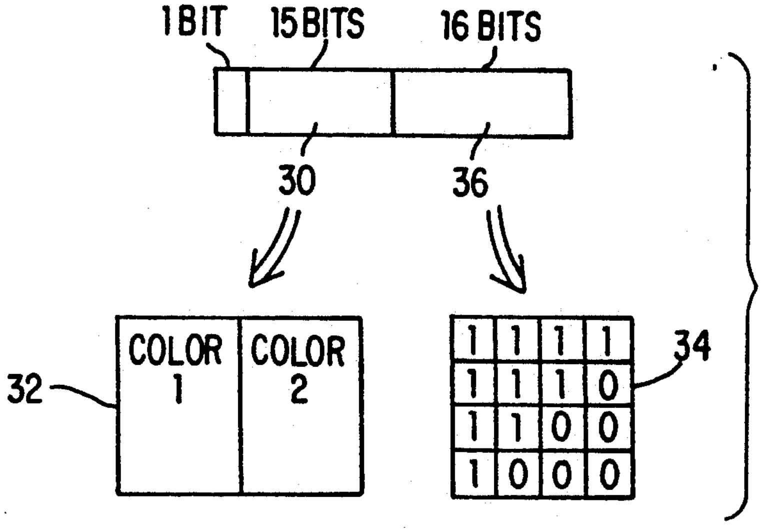

FIG. 5A illustrates the division of bits in a four color-separation imaging system, where 31 bits are used to specify a color. As illustrated in FIG. 5B, in this approach, a first bit can provide a flag instructing the system whether tables should be referenced. Accordingly, if the first bit is one, as illustrated in FIGS. 5B–5C, fifteen bits will be used as a table index 30 to a color entry table 32. This color entry table can be used only when two colors are provided in the expanded pixel. The remaining sixteen bits will be used as a reference 36 to a bit map pattern selecting table 34. The bit map indicates which of the two representative colors should be used with each of the high-resolution pixels. This type of approach requires no more memory capability than a frame buffer having only moderate resolution pixels. It is particularly useful for graphical objects and text where only two colors are present (object color and background.)

While this approach is illustrated for use when two colors are present, the approach can also be used when three colors are present, two colors and an intermediate color are present, etc.

The frame buffer in accordance with the present invention thus enables pictorial material, textual material and synthetic graphic material to be imaged using a single, split-level frame buffer. Object interiors may be imaged at a moderate resolution level while edges which must be crisp and clear in appearance may be imaged at a higher resolution level using only a single frame buffer. High quality images are obtained without requirements of complex configuration and high bandwidth. Different types of material can be processed simultaneously without requiring, for example, pictorial material to be separated from textual and graphic material and combination of the result in a final imaging stage.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A single frame buffer for use in a color imaging system, said frame buffer comprising a plurality of pixels having a first resolution level and a plurality of bits per pixel, said plurality of pixels comprising a first group of pixels having a first characteristic and at least a second group of pixels having a second characteristic different from said first characteristic, said frame buffer further comprising pixel replacement means for replacing said second group of pixels with substitute pixels, said substitute pixels having a resolution level which is higher than said first resolution level.

2. The frame buffer according to claim 1, wherein said plurality of bits comprise a number of bits sufficient to represent pictorial images.

3. The frame buffer according to claim 1, wherein said second characteristic is that said second group of pixels are located along edges of objects being imaged.

4. The frame buffer according to claim 1, wherein some color values serve as an indicator of whether said pixel replacement means is to replace a pixel with said substitute pixels.

5. The frame buffer according to claim 1, wherein at least one bit of a color separation in a pixel location serves as an indicator of whether said pixel replacement means is to replace a pixel with said substitute pixels.

6. The frame buffer according to claim 1, said pixel replacement means comprising a pointer provided at a location of a pixel being replaced, said pointer providing an instruction to replace said pixel with said substitute pixels.

7. The frame buffer according to claim 1, wherein said pixel replacement means comprises a hash and a hash table, said hash being provided at a location of a pixel being replaced, said hash table storing pixel location and said substitute pixels according to hash table entries, said hash providing an index to said entries in said hash table.

8. The frame buffer according to claim 1, wherein said substitute pixels are arranged into scan line buckets, said pixel replacement means searching said scan line buckets for an appropriate bucket, said appropriate bucket including substitute pixels having a desired resolution higher than said first resolution level.

9. The frame buffer according to claim 8, wherein entries in said scan line buckets are sorted into raster order to facilitate retrieval as said frame buffer is imaged.

10. The frame buffer according to claim 1, wherein said pixel replacement means comprises a list of replacement colors and a mapping means providing the correspondence between the replacement colors and the said substitute pixels.

11. The frame buffer according to claim 10, wherein said list of replacement colors contains only two colors and said mapping means is a bitmap.

12. A method of color imaging using a single frame buffer, said method comprising providing said frame buffer with a plurality of pixels having a first resolution level and a plurality of bits per pixel, said plurality of pixels comprising a first group of pixels having a first characteristic and at least a second group of pixels having a second characteristic different from said first characteristic, said method further comprising replacing said second group of pixels with substitute pixels provided in said frame buffer, said substitute pixels having a resolution level which is higher than said first resolution level.

13. The method according to claim 12, including providing a number of bits per pixel sufficient to represent pictorial images.

14. The method according to claim 12, wherein said second characteristic is that said second group of pixels are located along edges of objects being imaged.

15. The method according to claim 12, wherein some color values serve as an indicator of whether said pixel replacement means is to replace a pixel with said substitute pixels.

16. The method according to claim 12, wherein at least one bit of a color separation in a pixel location serves as an indicator of whether said pixel replacement means is to replace a pixel with said substitute pixels.

17. The method according to claim 12, wherein said replacing includes providing a pointer at a location of a pixel being replaced, said pointer providing an instruction to replace said pixel with said substitute pixels.

18. The method according to claim 12, wherein said replacing includes providing a hash at a location of a pixel being replaced and providing a hash table, said hash table storing pixel location and said substitute pixels according to hash table entries, said hash providing an index to said entries in said hash table.

19. The method according to claim 12, wherein said replacing includes arranging said substitute pixels into scan line buckets and searching said scan line buckets for an appropriate bucket, said appropriate bucket including substitute pixels having a desired resolution level higher than said first resolution level.

20. The method according to claim 19, including sorting said scan line buckets into raster order to facilitate retrieval as said frame buffer is imaged.

21. The method according to claim 12, wherein said pixel replacing comprises providing a list of replacement colors and providing a mapping means providing the correspondence between the replacement colors and the said substitute pixels.

22. The method according to claim 21, wherein said list of replacement colors contains only two colors and said mapping means is a bitmap.

* * * * *